(12) United States Patent
Yochai

(10) Patent No.: US 9,152,349 B2
(45) Date of Patent: Oct. 6, 2015

(54) AUTOMATED INFORMATION LIFE-CYCLE MANAGEMENT WITH THIN PROVISIONING

(75) Inventor: Yechiel Yochai, Lincoln, RI (US)

(73) Assignee: EMC Corporation, Hopkinton, MA (US)

( * ) Notice: Subject to any disclaimer, the term of this patent is extended or adjusted under 35 U.S.C. 154(b) by 994 days.

(21) Appl. No.: 11/726,831

(22) Filed: Mar. 23, 2007

(65) Prior Publication Data

US 2009/0070541 A1    Mar. 12, 2009

(51) Int. Cl.
  G06F 7/00       (2006.01)
  G06F 17/00     (2006.01)
  G06F 17/30     (2006.01)
  G06F 3/06       (2006.01)

(52) U.S. Cl.
  CPC .......... G06F 3/0665 (2013.01); G06F 3/0605 (2013.01); G06F 3/0644 (2013.01); G06F 3/0649 (2013.01); G06F 3/0683 (2013.01); G06F 17/30067 (2013.01); G06F 17/30286 (2013.01)

(58) Field of Classification Search
  CPC ...................... G06F 17/30067; G06F 17/30286
  See application file for complete search history.

(56) References Cited

U.S. PATENT DOCUMENTS

| | | | |
|---|---|---|---|
| 5,206,939 A | | 4/1993 | Yanai et al. |
| 5,379,391 A | * | 1/1995 | Belsan et al. ................. 711/114 |
| 5,581,724 A | * | 12/1996 | Belsan et al. ................. 711/114 |
| 5,778,394 A | | 7/1998 | Galtzur et al. |
| 5,845,147 A | | 12/1998 | Vishlitzky et al. |
| 5,857,208 A | | 1/1999 | Ofek |
| 6,446,161 B1 | * | 9/2002 | Yamamoto et al. ........... 711/114 |
| 6,529,995 B1 | * | 3/2003 | Shepherd ....................... 711/114 |
| 6,779,094 B2 | * | 8/2004 | Selkirk et al. .................. 711/165 |
| 6,779,095 B2 | * | 8/2004 | Selkirk et al. .................. 711/165 |
| 7,085,909 B2 | * | 8/2006 | Ananthanarayanan et al. .............................. 711/202 |
| 7,093,088 B1 | * | 8/2006 | Todd et al. ..................... 711/162 |
| 7,467,143 B2 | * | 12/2008 | Nojima ................................. 1/1 |
| 7,480,766 B2 | * | 1/2009 | Gorobets ....................... 711/115 |
| 7,506,012 B2 | * | 3/2009 | Nishikawa et al. .................... 1/1 |
| 7,747,837 B2 | * | 6/2010 | Gorobets et al. .............. 711/203 |
| 2002/0178335 A1 | * | 11/2002 | Selkirk et al. ................. 711/162 |
| 2003/0195886 A1 | | 10/2003 | Vishlitzky et al. |
| 2005/0193058 A1 | * | 9/2005 | Yasuda et al. ................. 709/203 |

(Continued)

FOREIGN PATENT DOCUMENTS

EP    0 801 344 A2    10/1997
EP    1 657 630 A1    5/2006

OTHER PUBLICATIONS

Bieniek, Daren. "The Essential Guide to Table Partitioning and Data Lifecycle Management," Special Advertising Supplement, *SQL Server Magazine and Windows IT Pro*, Mar. 2006.

(Continued)

*Primary Examiner* — Loan T Nguyen
(74) *Attorney, Agent, or Firm* — Muirhead and Saturnelli, LLC

(57) ABSTRACT

A system for managing data includes providing at least one logical device having a table of information that maps sections of the logical device to sections of at least two storage areas. Characteristics of data associated with at least one section of the logical device may be evaluated. The at least one section of the data may moved between the at least two storage areas according to a policy and based on the characteristics of the data. The table of information is updated according to the movement of data between the at least two storage areas.

20 Claims, 9 Drawing Sheets

(56) References Cited

U.S. PATENT DOCUMENTS

| | | | |
|---|---|---|---|
| 2006/0161749 A1* | 7/2006 | Chen et al. | 711/164 |
| 2006/0184565 A1 | 8/2006 | Nishikawa et al. | |
| 2006/0206507 A1* | 9/2006 | Dahbour | 707/100 |
| 2006/0224844 A1 | 10/2006 | Kano et al. | |
| 2006/0277334 A1* | 12/2006 | Sim et al. | 710/62 |

OTHER PUBLICATIONS

Maitland, Jo. "Storage Technology News," Search Storage.com, Jun. 2, 2004.

* cited by examiner

AUTOMATED INFORMATION LIFE-CYCLE MANAGEMENT WITH THIN PROVISIONING

TECHNICAL FIELD

This application relates to computer storage devices and, more particularly, to the field of managing data stored on a computer storage device.

BACKGROUND OF THE INVENTION

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Information Lifecycle Management (ILM) concerns the management of data throughout the data's lifecycle. The value of data may change over time and, accordingly, the needs for the storage and accessibility of the data may change during the lifecycle of the data. For example, data that is initially accessed often may, over time, become less valuable and the need to access that data become more infrequent. It may not be efficient for such data infrequently accessed to be stored on a fast and expensive storage device. On the other hand, older data may suddenly become more valuable and, where once accessed infrequently, become more frequently accessed. In this case, it may not be efficient for such data to be stored on a slower storage system when data access frequency increases.

Accordingly, it would be desirable to provide a system that allows for the efficient automatic management of data in a storage system throughout the data's lifecycle on each section of the user logical volume based on a user defined policy.

SUMMARY OF THE INVENTION

According to the system described herein, a method for managing data includes providing at least one logical device having a table of information that maps sections of the logical device to sections of at least two storage areas. Characteristics of data associated with at least one section of the logical device may be evaluated. At least one section may be moved between the at least two storage areas according to a policy and based on the characteristics of the data. The table of information is updated according to the movement of data between the at least two storage areas. In response to a request for accessing data of the at least one logical device, a location of the data is determined on the at least two storage areas and the data is accessed on the particular one of the storage areas using the table of information. In response to a request for writing new data to the logical device, an available location for the new data may be determined on at least one of the at least two storage areas and the new data written to at least one of the storage areas.

The characteristics of the data may include at least one of: frequency of use of the data, a time of last use of the data, and user information associated with the data. Characteristics of the data may be updated after data access. Moving data between the at least two storage areas may be performed automatically based on at least one of: periodically and after a trigger event and/or may be initiated by a user or administrator. The trigger event may include at least one of: a log in by a user, a log out by a user, and an assessment of at least one of the two storage areas. The policy may include criteria for managing data according to at least one of: frequency of use of the data, a time of last use of the data, and user information associated with the data. The logical device may include a thin device and each of the at least two storage areas may include a data device. Further, another logical device may be provided that is served by a same pool of data devices as the at least one logical device.

According further to the system described herein, a computer program product, stored in a computer-readable medium, for managing data includes executable code that provides at least one logical device having a table of information that maps sections of the logical device to sections of at least two storage areas. Executable code may be provided that evaluates characteristics of data associated with at least one section of the logical device. Executable code may be provided that moves the at least one section between the at least two storage areas according to a policy and based on the characteristics of the data. Executable code may be provided that updates the table of information according to the movement of data between the at least two storage areas. Executable code may be provided that, in response to a request for accessing data of the at least one logical device, determines a location of the data on the at least two storage areas and accesses the data on the particular one of the storage areas using the table of information. Executable code may be provided that, in response to a request for writing new data to the at least one logical device, determines an available location for the new data on at least one of the at least two storage areas and writes the new data to at least one of the storage areas. Further, executable code may be provided that provides another logical device that is linked to the at least one logical device.

According further to the system described herein, a computer storage device includes a plurality of interconnected directors, wherein at least some of the directors handle reading and writing data for the computer storage device. A plurality of disk drives, coupled to at least some of the directors, store data for the computer storage device. Computer software, provided on a computer readable medium of at least one of the directors, includes executable code that provides at least one logical device having a table of information that maps sections of the logical device to sections of at least two storage areas associated with the disk drives; executable code that evaluates characteristics of data associated with the at least one section of the logical device; executable code that moves the at least one section between the at least two storage areas according to a policy and based on the characteristics of the data; and executable code that updates the table of information according to the movement of data between the at least two storage areas.

BRIEF DESCRIPTION OF THE DRAWINGS

Embodiments of the system are described with reference to the several figures of the drawings, described as follows.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system.

Figure 1:
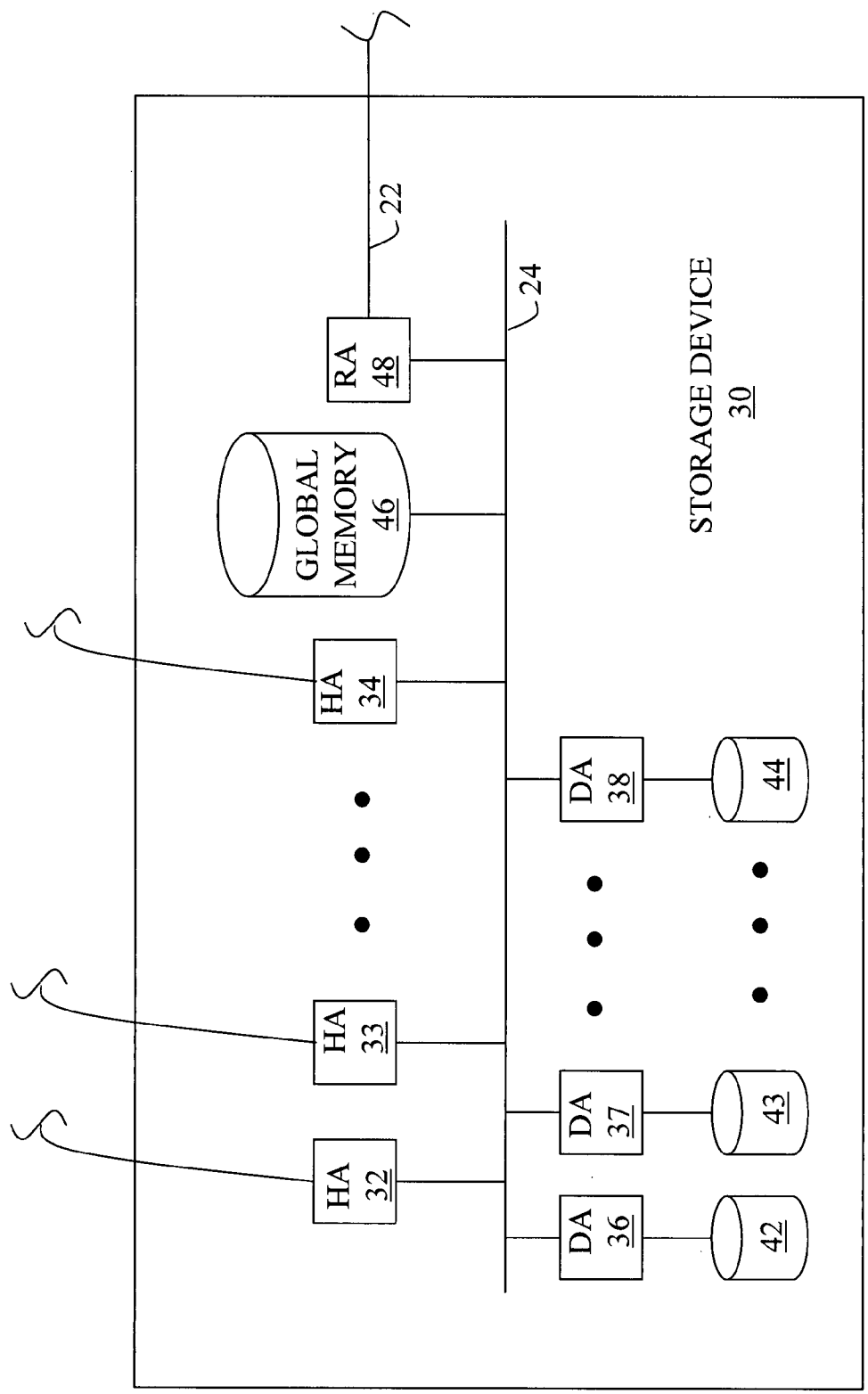
FIG. 1 is a schematic diagram showing a plurality of hosts and a data storage device in connection with an embodiment of the system described herein.

FIG. 1 is a schematic illustration showing a storage device 30 that includes a plurality of host adapters (HA) 32-34, a plurality of disk adapters (DA) 36-38 and a plurality of disk drives 42-44. Each of the disk drives 42-44 is coupled to a corresponding one of the DA's 36-38. Although FIG. 1 shows a one-for-one correspondence between the DA's 36-38 and the disk drives 36-38, it should be understood that it is possible to couple more than one disk drive to a DA and/or to couple more than one DA to a disk drive. The storage device 30 also includes a global memory 46 that may be accessed by the HA's 32-34 and the DA's 36-38. The storage device 30 also includes an RDF adapter (RA) 48 that may also access the global memory 46. The RA 48 may communicate with one or more additional remote storage devices (not shown) and/or one or more other remote devices (not shown) via a data link 22. The HA's 32-34, the DA's 36-38, the global memory 46 and the RA 48 may be coupled to a bus 24 that is provided to facilitate communication therebetween. In various embodiments, additional RA's may be incorporated into the storage device 30.

Each of the HA's 32-34 may be coupled to one or more host computers (not shown) that access the storage device 30. The host computers (hosts) access data on the disk drives 42-44 through the HA's 32-34 and the DA's 36-38. The global memory 46 contains a cache memory that holds tracks of data read from and/or to be written to the disk drives 42-44 as well as storage for tables that may be accessed by the HA's 32-34, the DA's 36-38 and the RA 48. Note that, for the discussion herein, blocks of data are described as being a track or tracks of data. However, it will be appreciated by one of ordinary skill in the art that the system described herein may work with any appropriate incremental amount, or section, of data, including possibly variable incremental amounts of data and/or fixed incremental amounts of data.

Figure 2:
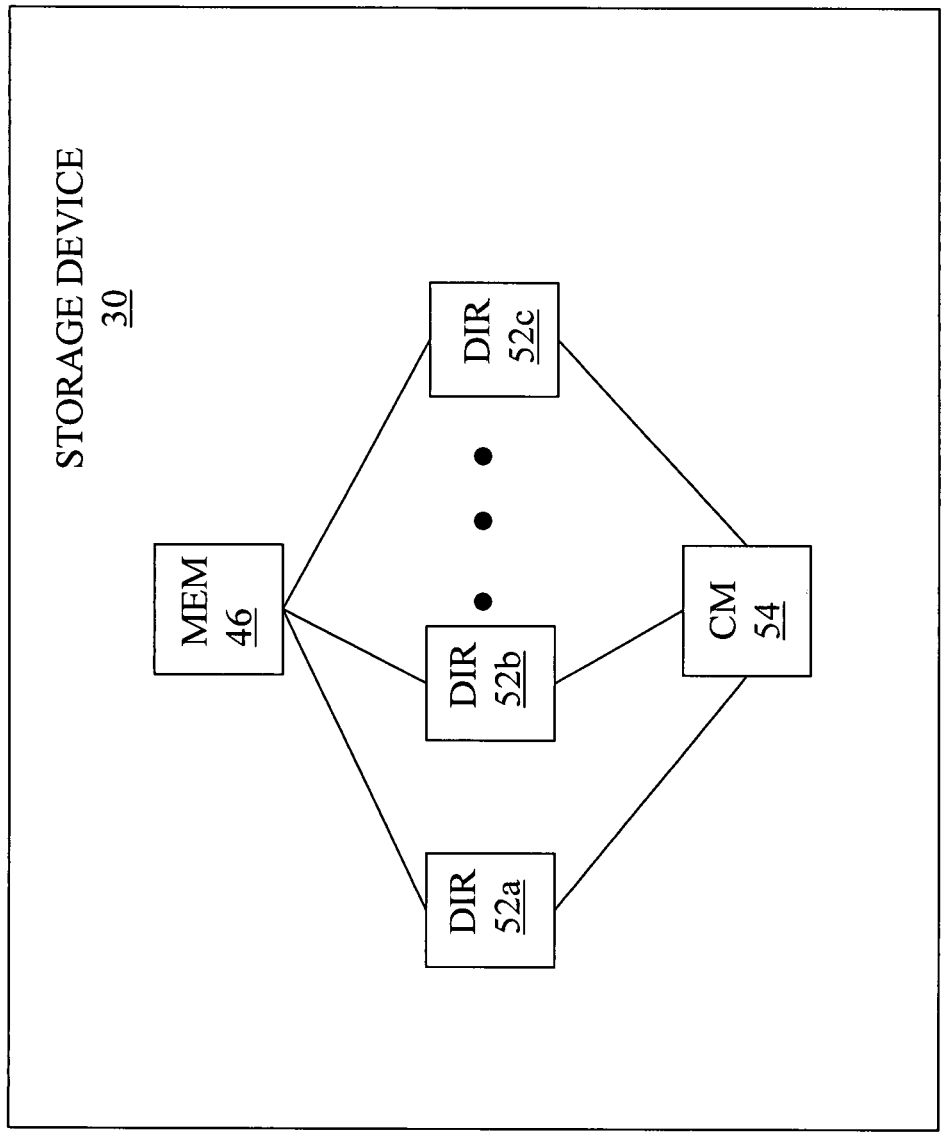
FIG. 2 is a schematic diagram showing a storage device, memory, a plurality of directors, and a communication module in connection with an embodiment of the system described herein.

FIG. 2 is schematic diagram showing an embodiment of the storage device 30 where each of a plurality of directors 52a-52c are coupled to the memory 46. Each of the directors 52a-52c may represent one or more of the HA's 32-34, the DA's 36-38 and/or RA 48. In an embodiment disclosed herein, there may be up to sixty-four directors coupled to the memory 46. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 46. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of different types of director and perform other processing with the other processing system.

The system described herein is suitable for use with the technique of thin provisioning. Thin provisioning allows for the creation of logical volumes of storage space where allocation of physical storage space occurs only when space is actually needed (e.g., when data is written in the first time to the storage space). Logical storage space may be identified to a user as being available even though no physical storage space has been committed, at least initially. When data is written to the logical storage space, physical storage space is drawn for use from a pool of physical storage space, as further described elsewhere herein. In addition, as described in more detail elsewhere herein, stored data may be moved between physical locations using the storage infrastructure described herein.

Figure 3:
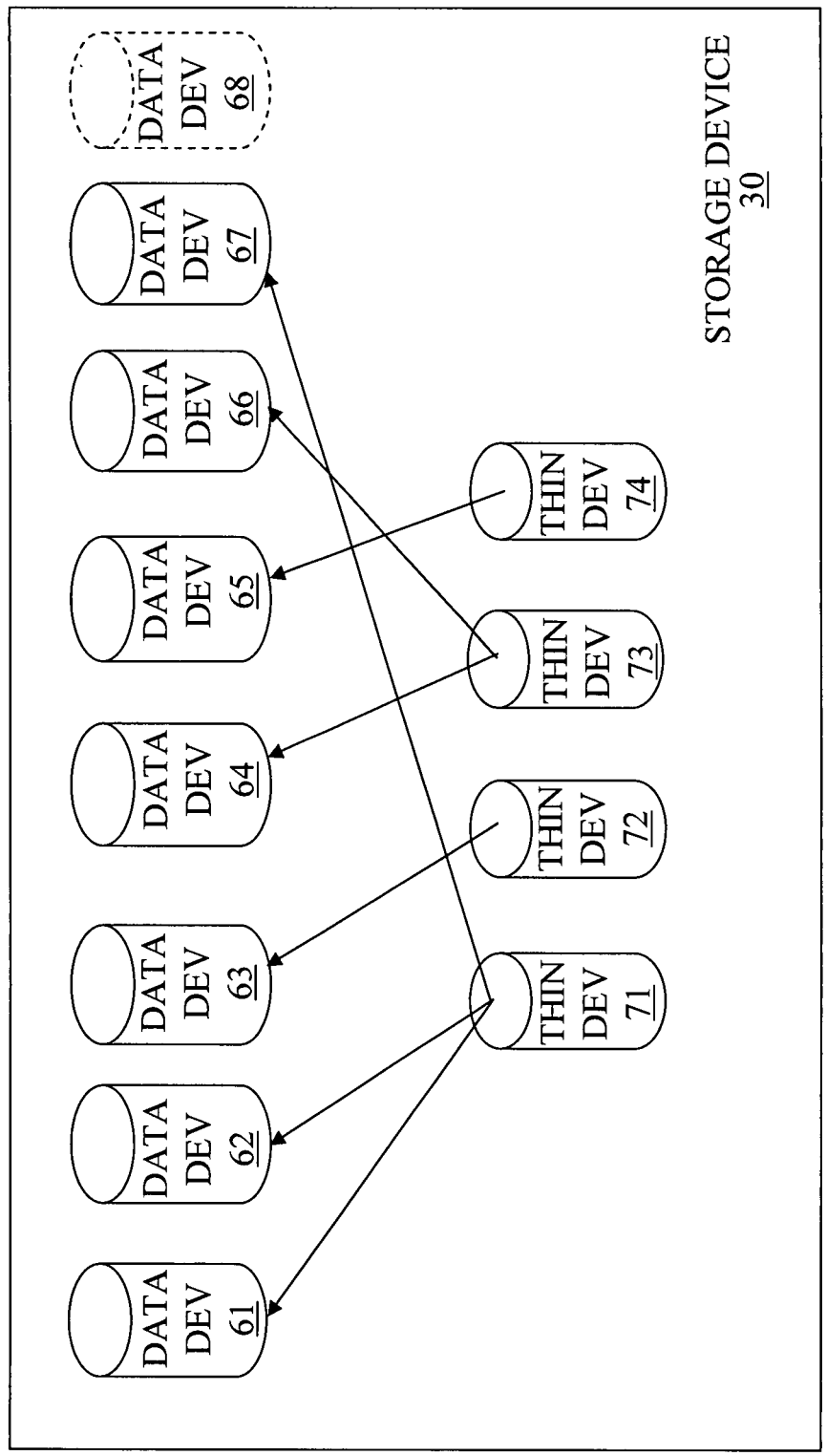
FIG. 3 is a schematic diagram showing a storage device including thin devices and data devices in connection with an embodiment of the system described herein.

FIG. 3 is a schematic diagram showing the storage device 30 as including a plurality of data devices 61-68. Data devices 61-67 may be implemented as logical devices like standard logical devices provided in a Symmetrix data storage device. In some embodiments, the data devices 61-67 may not be directly useable (visible) to hosts coupled to the storage device 30. Each of the data devices 61-67 may correspond to a portion (including a whole portion) of one or more of the disk drives 42-44. Thus, for example, the data device 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds (or some other relevant distinguishing characteristic or combination of characteristics), as further discussed elsewhere herein. The data device 68 is illustrated with broken lines to indicate that the data device 68 that does not yet exist but may be created, as further discussed elsewhere herein.

The storage device 30 may also include one or more thin devices 71-74. Each of the thin devices 71-74 may appear to a host coupled to the storage device 30 as a logical volume (logical device) containing a contiguous block of data storage. Each of the thin devices 71-74 may contain tables that point to some or all of the data devices 61-67 (or portions thereof), as further discussed elsewhere herein. In some instances, the thin devices 71-74 may be concatenated to form a metavolume of thin devices. In some embodiments, only one thin device may be associated with the same data device while, in other embodiments, multiple thin devices may be associated with the same data device.

In some embodiments, it may be possible to implement the system described herein using storage areas, instead of storage devices. Thus, for example, the thin devices 71-74 may be thin storage areas, the data devices 61-67 may be standard logical areas, and so forth. In some instances, such an implementation may allow for hybrid logical devices where a single logical device has portions that behave as a data device and/or portions that behave as a thin device. Accordingly, it should be understood that, in appropriate instances, references to devices in the discussion herein may also apply to storage areas that may or may not correspond directly with a storage device.

Figure 4:
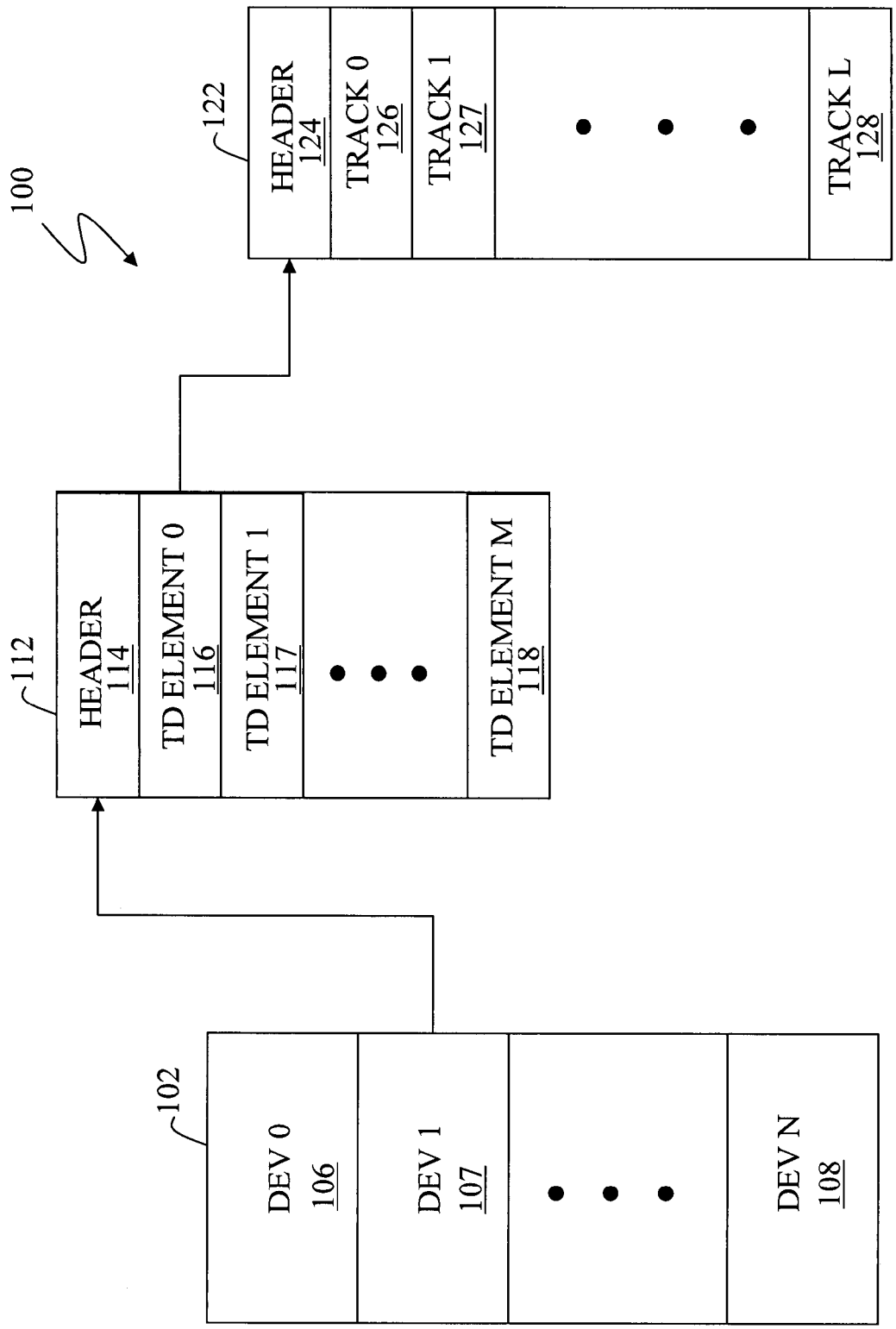
FIG. 4 is a schematic diagram illustrating tables that are used to keep track of device information in connection with an embodiment of the system described herein.

FIG. 4 is a diagram 100 illustrating tables that are used to keep track of device information. A first table 102 corresponds to all of the devices used by a storage device or by an element of a storage device, such as an HA and/or a DA. The table 102 includes a plurality of logical device (logical volume) entries 106-108 that correspond to all the logical devices used by the storage device (or portion of the storage device). The entries in the table 102 may include information for thin devices, for data devices, for standard logical devices, for virtual devices, for BCV devices, and/or any or all other types of logical devices used in connection with the system described herein.

Each of the entries 106-108 of the table 102 correspond to another table that may contain information for one or more logical volumes, such as thin device logical volumes. For example, the entry 107 may correspond to a thin device table 112. The thin device table 112 may include a header 114 that contains overhead information, such as information identifying the corresponding thin device, information concerning the last used data device and/or other information including counter information, such as a counter that keeps track of used group entries (described below). The header information, or portions thereof, may be available globally to the storage device 30.

The thin device table 112 may include one or more group elements 116-118, that contain information corresponding to a group of tracks on the data device. A group of tracks may include one or more tracks, the number of which may be configured as appropriate. In an embodiment herein, each group has sixteen tracks, although this number may be configurable.

One of the group elements 116-118 (for example, the group element 116) of the thin device table 112 may identify a particular one of the data devices 61-67 having a track table 122 that contains further information, such as a header 124 having overhead information and a plurality of entries 126-128 corresponding to each of the tracks of the particular one of the data devices 61-67. The information in each of the entries 126-128 may include a pointer (either direct or indirect) to the physical address on one of the disk drives 42-44 of the storage device 30 (or a remote storage device if the system is so configured) that maps to the logical address(es) of the particular one of the data devices 61-67. Thus, the track table 122 may be used in connection with mapping logical addresses of the logical devices corresponding to the tables 102, 112, 122 to physical addresses on the disk drives 42-44 of the storage device 30.

The tables 102, 112, 122 may be stored in the global memory 46 of the storage device 30. In addition, the tables corresponding to particular logical devices accessed by a particular host may be stored (cached) in local memory of the corresponding one of the HA's 32-36. In addition, the RA 48 and/or the DA's 36-38 may also use and locally store (cache) portions of the tables 102, 112, 122.

Figure 5:
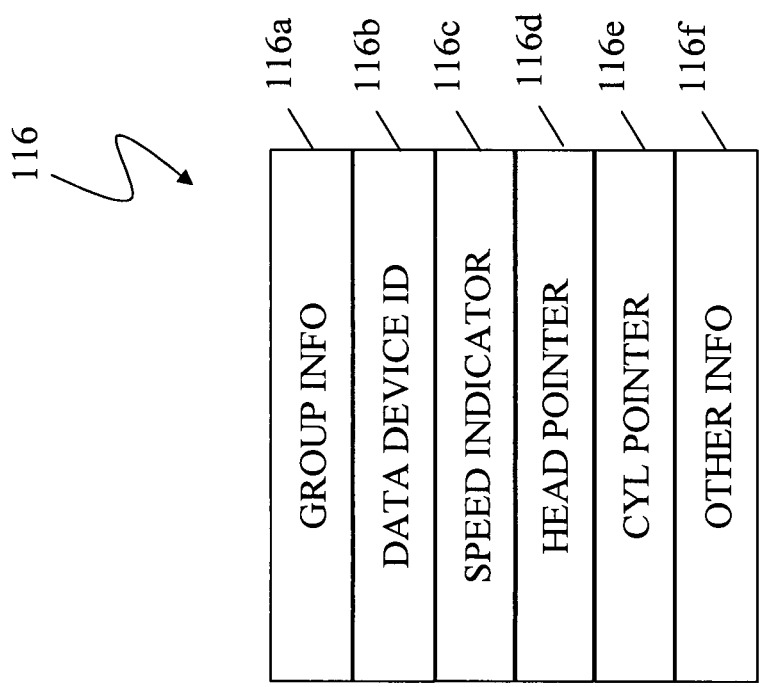
FIG. 5 is a schematic diagram showing a group element of a thin device table in connection with an embodiment of the system described herein.

FIG. 5 is a schematic diagram illustrating a group element 116 of the thin device table 112 in connection with an embodiment of the system described herein. The group element 116 may includes a plurality of entries 116a-116f. The entry 116a may provide group information, such as a group type that indicates whether there has been physical address space allocated for the group. The entry 116b may include information identifying one (or more) of the data devices 61-67 that correspond to the group (i.e., the one of the data devices 61-67 that contains pointers for physical data for the group). The entry 116c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 116d may be a pointer to a head of the first allocated track for the one of the data devices 61-67 indicated by the data device ID entry 116b. Alternatively, the entry 116d may point to header information of the data device track table 122 immediately prior to the first allocated track. The entry 116e may identify a cylinder of a first allocated track for the one the data devices 61-67 indicated by the data device ID entry 116b. The entry 116f may contain other information corresponding to the group element 116 and/or the corresponding thin device. In other embodiments, entries of the group table 116 may identify a range of cylinders of the thin device and a corresponding mapping to map cylinder/track identifiers for the thin device to tracks/cylinders of a corresponding data device. In an embodiment, the size of table element 116 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives 42-44. Thus, an access of the logical storage space of the thin device results in either a null pointer (or equivalent) indicating that no corresponding physical storage space has yet been allocated, or results in a reference to a data device which in turn references the underlying physical storage space.

Figure 6:
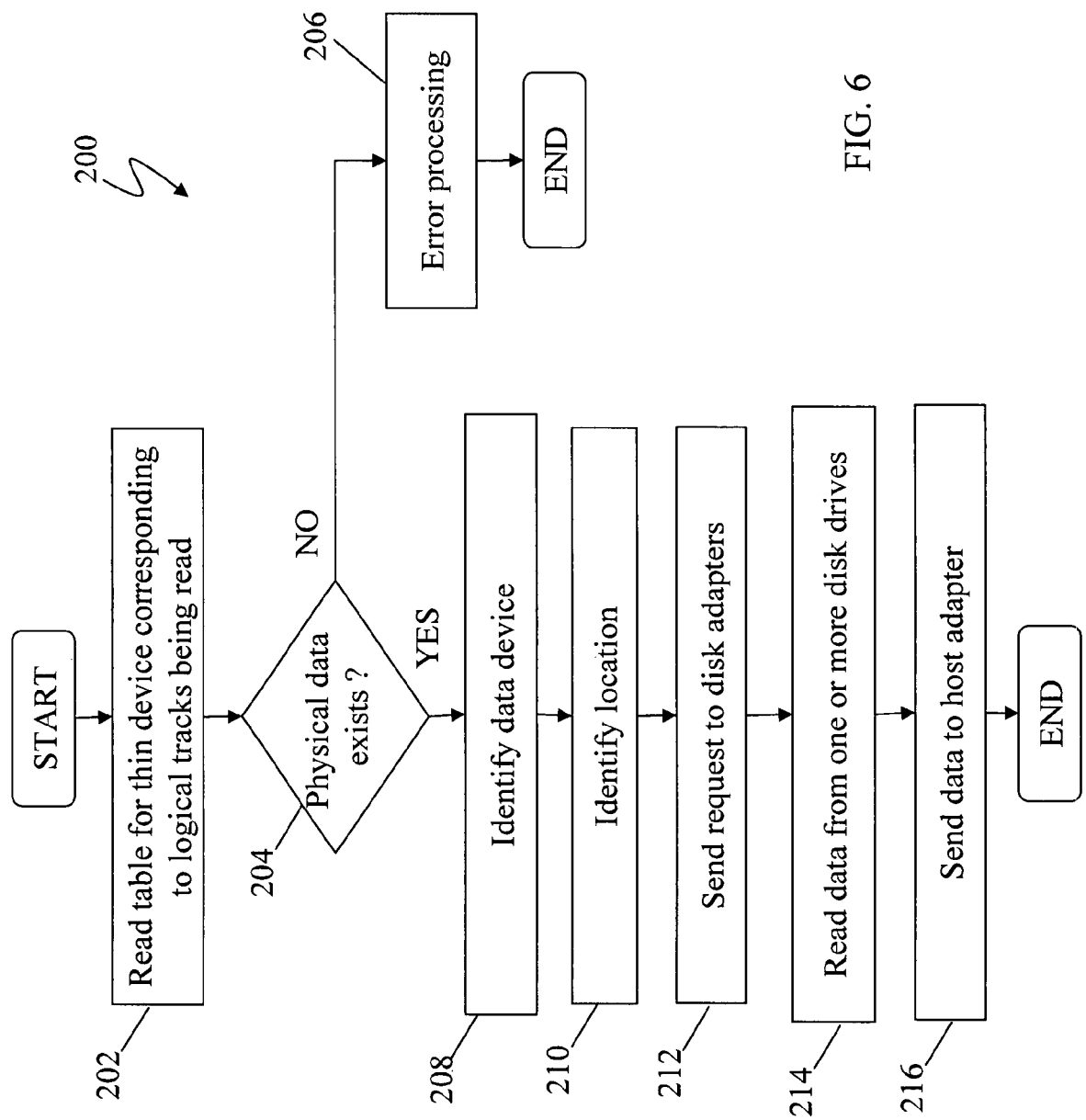
FIG. 6 is a flow diagram illustrating processing for handling a read of one or more logical tracks of a thin device in connection with an embodiment of the system described herein.

FIG. 6 is a flow diagram 200 illustrating processing for handling a read of one or more logical tracks of one of the thin devices 71-74 in an embodiment of the system described herein. In a step 202, an appropriate one of the host adapters 32-34 reads the group table 112 of the one of the thin devices 71-74 corresponding to the logical tracks being read. After the step 202, at a test step 204, it is determined whether the logical tracks identified from the group table 112 corresponds to any of the data devices 61-67 (i.e., if there is physical data corresponding to the logical tracks being read). If there is no corresponding physical data (meaning that no logical track(s) were ever written), then processing proceeds to a step 206 where an error processing is performed, such as returning a NULL value to the host. Other appropriate error processing may be performed at the step 206. After the step 206, processing is complete.

If it is determined at the step 204 that there is physical data corresponding to the logical tracks being read, then processing proceeds to a step 208 where one or more of the data devices 61-67 associated with the logical tracks being read are identified from the group table 112. After the step 208, processing proceeds to a step 210 where the track table 122 is read from the identified one or more of the data devices 61-67 and the corresponding location of the physical data (i.e., cylinder and track) is determined. As further discussed elsewhere herein, physical storage space may be provided in connection with one data device and/or by a concatenation of multiple data devices or portions thereof. Logical storage space of the physical devices maps to logical storage space. After the step 210, processing proceeds to a step 212 where a request may be sent to one or more disk adapters 36-38 corresponding to disk drives 42-44 that provide the physical storage space associated with the identified one of the data devices 61-67 and corresponding location information. After the step 212, processing proceeds to a step 214 where the physical data is read. Note that the data may be stored in a cache or other memory (for example, the memory 46) in connection with being read. After the step 214, processing proceeds to a step 216 where the data may be received by an appropriate one of the host adapters 32-34 (e.g., by reading the memory 46). After the step 216, processing is complete.

Figure 7:
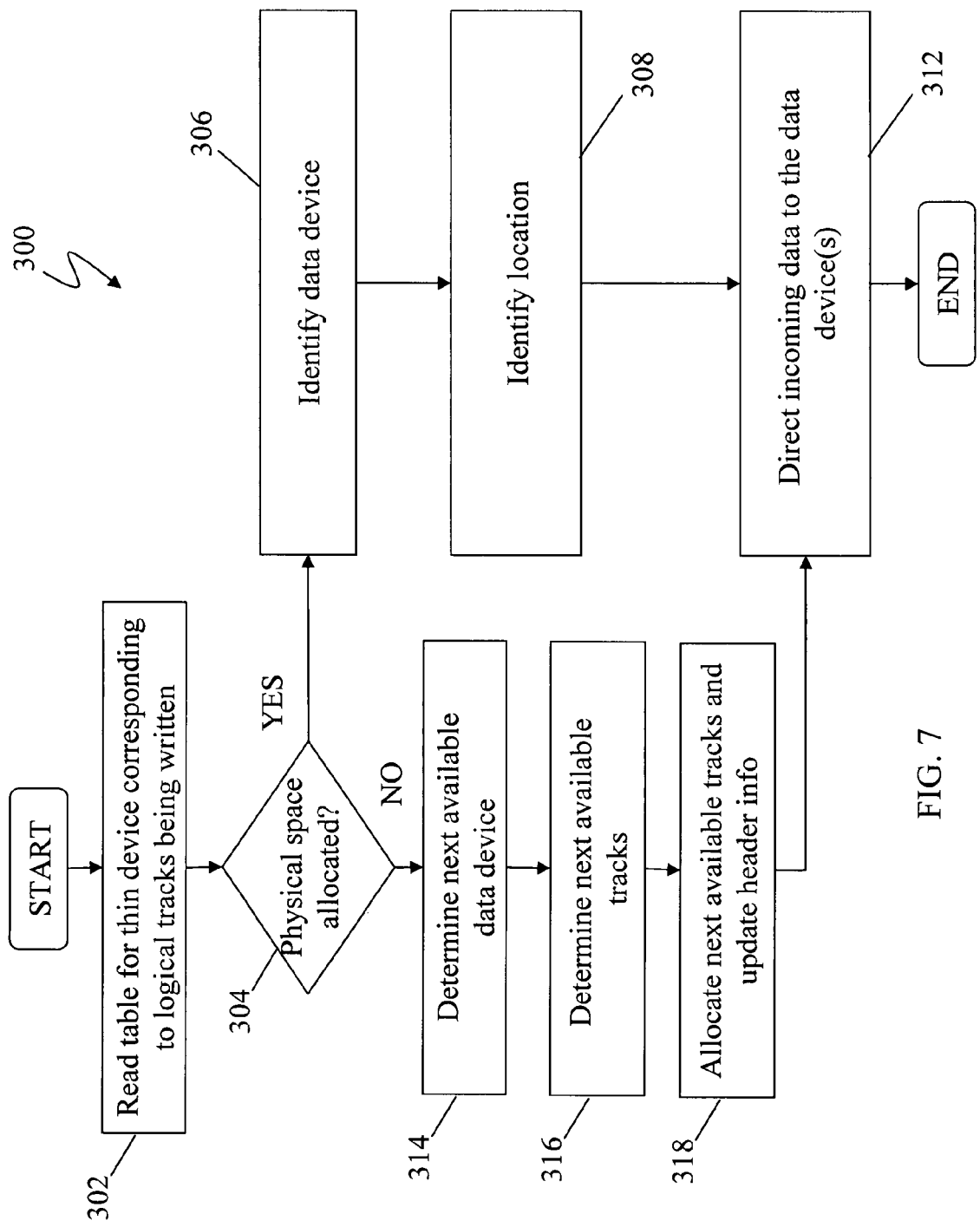
FIG. 7 is a flow diagram illustrating processing for handling a write of one or more logical tracks to the thin device in connection with an embodiment of the system described herein.

FIG. 7 is a flow diagram 300 illustrating processing for handling a write of logical track(s) to one or more of the thin device(s) 71-74 in connection with the system described herein. At a step 302, an appropriate one of the host adapters 32-34 reads the group table 112 of the one of the thin device(s) 71-74 corresponding to the logical tracks being written.

Following the step 302 is a test step 304 where it is determined whether physical space had been previously allocated (i.e., in a prior write operation) for the logical tracks being written. If so, then processing proceeds to a step 306 where the data device that includes the logical tracks is identified. After the step 306, is a step 308 where the track table 122 is read from the identified one or more of the data devices 61-67 and the corresponding location of the physical data (i.e., cylinder and track) is determined. As further discussed elsewhere herein, physical storage space may be provided in connection with one data device and/or by a concatenation of multiple data devices or portions thereof. Logical storage space of the physical devices maps to logical storage space. Following the step 308 processing proceeds to a step 312 where the data being written is directed to the appropriate physical storage space. The incoming data overwrites the appropriate portion of the data where directed. After the step 312, processing is complete.

If it is determined at the step 304 that there is no physical storage that has been allocated for the logical track(s) being written, then control transfers from the step 304 to a step 314, where a next available data device identifier (i.e., the data device 68) is determined. This information may be obtained from the header 114 of the device table 112. In an embodiment herein, data device identifiers are provided by numbers so that a next available data device identifier is simply one more than a last allocated data device.

After the step 314, processing proceeds to a step 316 where available physical storage space on the disk drives 42-44 is determined. In an embodiment herein, available physical storage space is allocated sequentially from one or more of the disk drives 42-44. Following the step 316 is a step 318 where a request may be sent to a disk adapter 36-38 to allocate the physical storage space for the write. Also at the step 318, header info is updated to reflect the newly allocated data device and physical tracks. After the step 318, processing proceeds to the step 312, discussed above, where the data being written is directed to the one or more data devices. After the step 312, processing is complete.

After the read and write processes illustrated in FIGS. 6 and 7, information concerning access of the data, such as access frequency, time of last access or use and/or other characteristics and statistics, may be updated and stored by the system described herein. The updated data access information or other characteristic information of the data and/or any portion of the data may, for example, be stored as an entry in a group element of the thin device table 112 (for example, the entry 116f of the group element 116 as shown in FIG. 5). Alternatively, the data characteristic information may be stored in a memory, such as the global memory 46 of the storage device 30, and a pointer to this information stored in the group element 116. Other implementations for storing and access of the data characteristic information are possible.

The allocation of the physical storage space for a thin device at the time of writing the data may be transparent to a user. For example, a user's inquiry into how much storage space is available on a particular thin device may indicate a maximum amount of physical storage space that could be allocated for a thin storage device (provisioned storage space) even though the corresponding physical storage space had not yet been allocated. In some embodiments, used physical storage space does not exceed 30% of the provisioned storage space.

In an embodiment herein, different of the physical data may be automatically moved between different physical disk drives or other storage devices with different characteristics according to one or more policies. For example, data may be initially allocated to a particular fast disk drive, but a portion of the data that has not been used over a period of time (for example, three weeks) may be automatically moved, according to the system described herein, to a slower (and perhaps less expensive) disk drive. The physical data may then be automatically moved back to the faster disk drive if the data is subsequently used and/or accessed according to a policy or other criteria (for example, accessed twice in any given week), as further described herein. Thus, the system described herein may operate to automatically move data between disk drives or other storage devices within the same machine according to the one or more policies.

A policy may be configured by an administrator on a system-wide level or may be specific to a particular user on a specific logical device. The system described herein allows for the remapping of physical data based on policy criteria or other statistics. For example, the policy may be based on the last time data was used and/or accessed. Alternatively, the policy may be based on anticipated use of data over specific times and/or dates. For example, data that is expected to be used at a particular time may be stored on relatively fast disk drives and then moved to relatively slow disk drives when it is expected that the data will not be used. Moreover, different policies and/or criteria may be implemented corresponding to different users and/or different levels of importance or security of data. For example, it may be known that user A accesses particular data more frequently than user B and, accordingly, the policy for moving physical data according to the system described herein may be to leave more data associated with user A on the relatively fast disk drive as compared with the data associated with user B. Alternatively, user A may access data that is generally of a higher level of importance or requires higher security than that of user B and, accordingly, the system described herein may maintain and/or move more data associated with user A on a disk drive that is relatively more reliable and/or secure as compared with the data associated with user B.

In an embodiment herein, data may be moved between physical disk drives (or other physical storage) having different characteristics, such as speed, cost, reliability, security and/or other characteristics. As discussed elsewhere herein, logical data devices may be established having different classes corresponding to characteristics of the physical disk drives to which the data devices are mapped. Further, it should be noted that any section of the logical device may be moved according to the system described herein based on the characteristics of the data.

Figure 8:
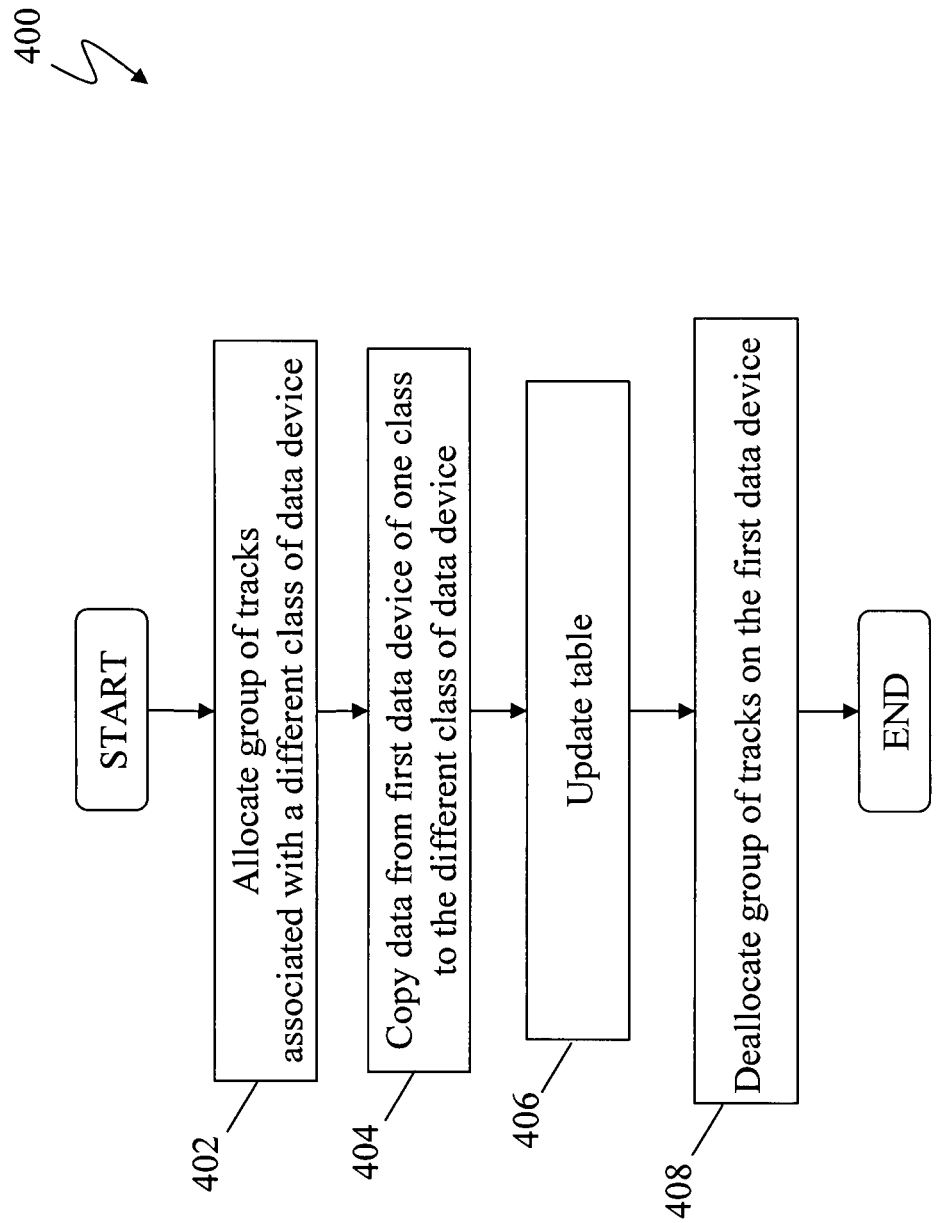
FIG. 8 is a flow diagram illustrating processing for copying and remapping physical data within a storage device in connection with an embodiment of the system described herein.

FIG. 8 is a flow diagram 400 illustrating processing for copying and remapping physical data according to the system described herein. In a step 402, a group of tracks is allocated on a data device having a second class than a data device of a first class, where the first and second classes are different. For example, the data device having a different class may be mapped to a physical disk drive that is slower than that of the data device of the first class, as further discussed elsewhere herein. After the step 402, processing proceeds to a step 404 where data associated with the data device of the first class is copied to a location corresponding to the data device of the second class. After the step 404, processing proceeds to a step 406 where the group table of the thin device is updated in accordance with the remapping. After the step 406, processing proceeds to a step 408 where the group of tracks associated with the data device of the first class, from which the data was copied, is deallocated, freeing the locations for future use.

Figure 9:
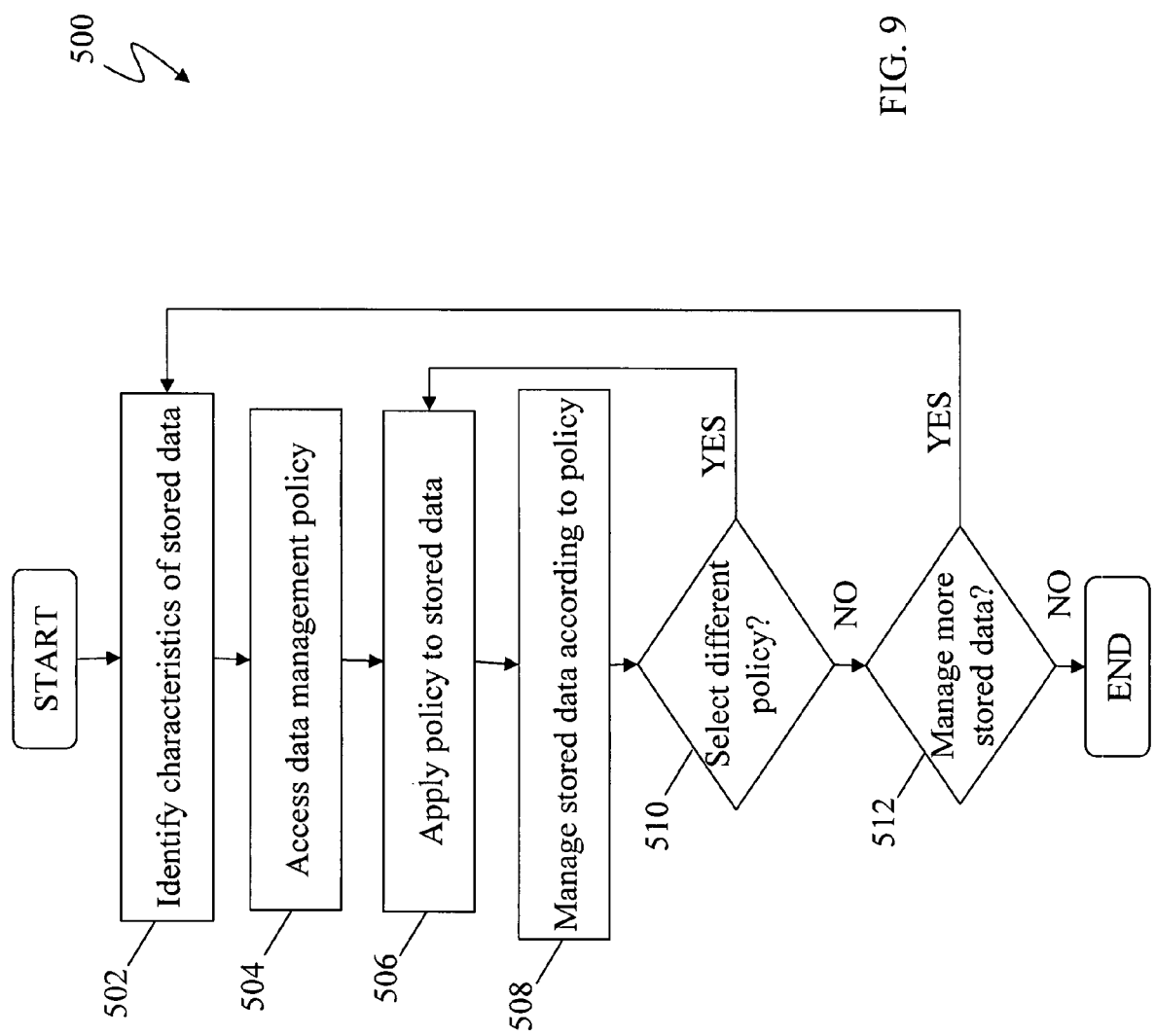
FIG. 9 is a flow diagram illustrating implementation of a policy to data storage and management in connection with an embodiment of the system described herein.

FIG. 9 is a flow diagram 500 illustrating implementation of a policy for data storage and management in connection with an embodiment of the system described herein. In a step 502, certain characteristics of stored data are identified (for example, from the group element 116, as discussed elsewhere herein). In various embodiments, the characteristics may include usage information such as when the stored data was last accessed and/or how often the stored data has been accessed over a specific time period (for example, hours, days, weeks, etc. . . . ). As further discussed elsewhere herein, the characteristics may also include particular user information corresponding to the stored data. After the step 502, processing proceeds to a step 504 where policy information is accessed. The policy information provides the specific criteria used for data storage and management.

After the step 504, processing proceeds to a step 506 where the policy is applied to the stored data. The policy may include criteria used for managing stored data such as criteria concerning frequency of use of data and/or criteria with respect to specific users and/or other criteria. The policy may be applied to identify data for lifecycle management according to characteristics of entire data volumes or any portions thereof.

After the step 506, processing proceeds to a step 508 where the data for which characteristics have been determined is managed according to the policy and based on the characteristics of the data. For example, data that is frequently used may be moved to a relatively fast storage device whereas data that has not been used over a certain period of time may be moved to a relatively slow storage device according to the data processing as discussed elsewhere herein. As noted herein, the data that is moved may be entire data volumes or portions thereof.

After the step 508, processing proceeds to a test step 510 where it is determined if another policy with other criteria should be applied to the stored data being managed. If an additional policy is to be applied, then processing proceeds to the step 506. If no further policies are to be applied then processing proceeds to a test step 512 where it is determined whether there is more data to be managed according to the system described herein. If there is further stored data to manage, then processing proceeds back to the step 502. If no further stored data is to be managed, then after the test step 512, processing is complete.

The above-noted steps may be performed automatically by the system described herein. For example, the above-noted steps may be performed periodically, at designated times, and/or after particular trigger events, such as access by a particular user to the system (log in and/or log out) and/or after assessment of space usage on the disk drives (for example, space usage on the fast disk drive). Alternatively, the above-noted steps may be activated manually by a user and/or a system administrator. In an embodiment, the system described herein may include a system having at least one processor that performs any of the above-noted steps. Further, computer software, stored in a computer-readable medium, may be provided according to the system described herein including executable code for carrying out any of the above-noted steps and processes.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for managing data in a thin provisioning environment, comprising:
   providing at least one first device having a first table of information that maps sections of the first device to allocated sections of physical storage space of at least one storage area among a plurality of storage areas;
   providing at least one second device, the second device being a logical device and including a thin device of the thin provisioning environment that presents storage space to one or more requesting devices as being available for input/output (I/O) operations even though no physical storage space has been initially committed for the I/O operations, wherein the thin device is not mapped directly to the physical storage space, and wherein the thin device includes a second table of information that: (i) maps sections of the thin device to the sections of the first device that are then mapped, using the first table of information, to the allocated sections of the physical storage space of the at least one storage area and (ii) identifies unallocated sections of the physical storage space of the plurality of storage areas and presents the unallocated sections of the physical storage space as available for I/O operations to any of the one or more requesting devices;

evaluating characteristics of data associated with at least one of the sections of the first device;

moving the data associated with the at least one of the sections of the first device from the physical storage space of the at least one storage area to the physical storage space of another of the plurality of storage areas according to a policy and based on the characteristics of the data; and updating the first table of information of the first device and the second table of information of the thin device according to the movement of the data among the physical storage space of the plurality of storage areas.

2. The method as recited in claim 1, further comprising:
in response to a request for accessing data associated with the first device, determining a location of the data on the plurality of storage areas and accessing the data on a particular one of the storage areas using the first table of information and the second table of information.

3. The method as recited in claim 1, further comprising:
in response to a request for writing new data to the first device, determining an available location for the new data on at least one of the plurality of storage areas and writing the new data to the at least one of the plurality of storage areas.

4. The method as recited in claim 1, wherein the characteristics of the data include at least one of: frequency of use of the data, a time of last use of the data, or user information associated with the data.

5. The method as recited in claim 1, further comprising:
updating characteristics of the data after data access.

6. The method as recited in claim 1, wherein moving the data among the plurality of storage areas is performed automatically according to at least one of: periodically or after a trigger event.

7. The method as recited in claim 6, wherein the trigger event includes at least one of: a log in by a user, a log out by a user, or an assessment of at least one of the plurality of storage areas.

8. The method as recited in claim 1, wherein the policy includes criteria for managing data according to at least one of: frequency of use of the data, a time of last use of the data, or user information associated with the data.

9. The method as recited in claim 1, wherein the first device includes a data device.

10. The method as recited in claim 1, further comprising:
providing another logical device that is served by a same pool of data devices as the second device.

11. A non-transitory computer-readable storage medium storing software for managing data, the software comprising:
executable code that provides at least one first device having a first table of information that maps sections of the first device to allocated sections of physical storage space of at least one storage area among a plurality of storage areas;

executable code that provides at least one second device, the second device being a logical device and including a thin device of the thin provisioning environment that presents storage space to one or more requesting devices as being available for input/output (I/O) operations even though no physical storage space has been initially committed for the I/O operations, wherein the thin device is not mapped directly to the physical storage space, and wherein the thin device includes a second table of information that: (i) maps sections of the thin device to the sections of the first device that are then mapped, using the first table of information, to the allocated sections of the physical storage space of the at least one storage area and (ii) identifies unallocated sections of the physical storage space of the plurality of storage areas and presents the unallocated sections of the physical storage space as available for I/O operations to any of the one or more requesting devices;

executable code that evaluates characteristics of the data associated with at least one of the sections of the first device;

executable code that moves the data associated with the at least one of the sections of the first device from the physical storage space of the at least one storage area to the physical storage space of another of the plurality of storage areas according to a policy and based on the characteristics of the data; and executable code that updates the first table of information of the first device and the second table of information of the thin device according to the movement of the data among the physical storage space of the plurality of storage areas.

12. The non-transitory computer-readable storage medium as recited in claim 11, further comprising:
executable code that, in response to a request for accessing data of the at least one first device, determines a location of the data on the plurality of storage areas and accesses the data on a particular one of the storage areas using the first table of information and the second table of information.

13. The non-transitory computer-readable storage medium as recited in claim 11, further comprising:
executable code that, in response to a request for writing new data to the at least one first device, determines an available location for the new data on at least one of the plurality of storage areas and writes the new data to the at least one of the plurality of storage areas.

14. The non-transitory computer-readable storage medium as recited in claim 11, wherein the characteristics of the data include at least one of: frequency of use of the data, a time of last use of the data, or user information associated with the data.

15. The non-transitory computer-readable storage medium as recited in claim 11, wherein moving the data among the plurality of storage areas is performed automatically according to at least one of: periodically or after a trigger event.

16. The non-transitory computer-readable storage medium as recited in claim 15, wherein the trigger event includes at least one of: a log in by a user, a log out by a user, or an assessment of at least one of the plurality of storage areas.

17. The non-transitory computer-readable storage medium as recited in claim 11, wherein the policy includes criteria for managing data according to at least one of: frequency of use of the data, a time of last use of the data, or user information associated with the data.

18. The non-transitory computer-readable storage medium as recited in claim 11, wherein the first device includes a data device.

19. The non-transitory computer-readable storage medium as recited in claim 11, further comprising:

executable code that provides another logical device that is served by a same pool of data devices as the second device.

20. A computer storage device, comprising:
a plurality of interconnected directors, wherein at least some of the directors handle reading and writing data for the computer storage device;
a plurality of disk drives, coupled to at least some of the directors, that store data for the computer storage device; and
computer software, provided on a computer readable medium of at least one of the directors, having:
  executable code that provides at least one first device having a first table of information that maps sections of the first device to allocated sections of physical storage space of at least one storage area among a plurality of storage areas associated with the disk drives;
  executable code that provides at least one second device, the second device being a logical device and including a thin device of the thin provisioning environment that presents storage space to one or more requesting devices as being available for input/output (I/O) operations even though no physical storage space has been initially committed for the I/O operations, wherein the thin device is not mapped directly to the physical storage space, and wherein the thin device includes a second table of information that: (i) maps sections of the thin device to the sections of the first device that are then mapped, using the first table of information, to the allocated sections of the physical storage space of the at least one storage area and (ii) identifies unallocated sections of the physical storage space of the plurality of storage areas and presents the unallocated sections of the physical storage space as available for I/O operations to any of the one or more requesting devices;
  executable code that evaluates characteristics of the data associated with at least one of the sections of the first device;
  executable code that moves the data associated with the at least one of the sections of the first device from the physical storage space of the at least one storage area to the physical storage space of another of the plurality of storage areas according to a policy and based on the characteristics of the data; and
  executable code that updates the first table of information of the first device and the second table of information of the thin device according to the movement of the data among the physical storage space of the plurality of storage areas.

* * * * *